WILLIAM READING.
Improvement in Cow-Milkers.
No. 120,100 Patented Oct. 17, 1871.
Witnesses
Alex. Mahon
Norman B Smith
Inventor
Wm Reading
by his Attorney
A. M. Smith

UNITED STATES PATENT OFFICE.

WILLIAM READING, OF OFFUTT'S CROSS-ROADS, MARYLAND.

IMPROVEMENT IN COW-MILKERS.

Specification forming part of Letters Patent No. 120,100, dated October 17, 1871.

*To all whom it may concern:*

Be it known that I, WILLIAM READING, of Offutt's Cross-Roads, county of Montgomery, State of Maryland, have invented a new and useful Improvement in a Device for Milking Cows, of which the following is a full, clear, and exact description, reference being had to the accompanying drawing making part of this specification, which represents a device best adapted to carry out my invention.

It is a fact well known to dairymen and to most others who are accustomed to the care of milch-cows that it is very desirable that the milking of a cow should be done as rapidly as possible—that is, but little time should elapse between the commencement and the completion of the operation, and it has been the experience of all milkers that milking some cows is a slow and tedious undertaking, owing to the fact that the orifice at the lower end of the teat is small and tightly compressed. When the outlet is small, as above stated, it is almost impossible to dilate it to any considerable extent by any pressure which can be applied by the hand to the teat above, particularly if it (the teat) has been scratched by thorns or briars, or is sore or sensitive from any other cause.

My invention is designed to overcome the above-recited difficulties; and to this end it consists of a tube, A, of suitable size, terminating at one end in two fingers or dilators, *a*. These dilators should be made, by preference, semi-cylindrical, corresponding in their form to the tube of which they form extensions, but should taper slightly at their sides, so that when they are compressed they shall form a round tapering tube and should at their ends be bent a little inward, as shown in the drawing. The device may be made of metal, hard rubber, or other material having the desired elasticity.

By pressing the open or free ends of the fingers together they may be readily introduced into a teat having but a small orifice without producing any pain or uneasiness on the part of the cow, and when introduced and the grip upon the fingers released, the elasticity of the parts is such as to dilate the opening and allow the milk to escape freely through the body of the tube A.

It will be readily seen that the use of my device is not limited to cows which are hard-milkers; but I regard it as being particularly adapted for such cases, although it will be found to be a very expeditious means for milking any or all cows.

I am aware that devices for this purpose have been made elastic and compressible; but I am not aware of any heretofore made, which have fingers, that are so constructed that their inner ends can be compressed for the purpose of being thrust into the teat, and that will, after they have been inserted, spread apart and thrust back the soft and yielding flesh which would otherwise press upon and close the slot in the tube through which the milk is discharged. It will be readily seen that by my construction the inner end of the tube is most opened by its elasticity in such manner as to afford the largest possible outlet for the milk through the entire thickness of flesh at the end of the teat, which cannot be the case where the tube is tapering on all sides, and not oval, as mine is. All tubes, the construction of which, by their tapering shape and elasticity at the center, causes them to distend the flesh at the outer end of the teat more than at the inner surface of the thick flesh there are found to be painful to the cow, and, therefore, cannot be successfully used, even though it should be practicable to thrust it (the tubes) in far enough to allow the milk to flow in through the slots.

Having now described my invention, what I claim as new, and desire to secure by Letters Patent, is—

As a means of milking cows, the herein-described device, consisting of the tube A provided with the elastic fingers *a a*, open at their smaller ends, substantially as described.

In testimony whereof I have hereunto set my hand this 7th day of August, A. D. 1871.

WILLIAM READING.

Witnesses:
ALEXR. MAHON,
NORMAN B. SMITH.

(45)